(12) United States Patent
Kiyomizu et al.

(10) Patent No.: US 8,331,629 B2
(45) Date of Patent: *Dec. 11, 2012

(54) PERSONAL IDENTIFICATION APPARATUS AND METHOD USING LIVING BODY

(75) Inventors: Harumi Kiyomizu, Kokubunji (JP); Takafumi Miyatake, Hachioji (JP); Akio Nagasaka, Kokubunji (JP); Naoto Miura, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/093,991

(22) Filed: Apr. 26, 2011

(65) Prior Publication Data

US 2011/0254941 A1    Oct. 20, 2011

Related U.S. Application Data

(63) Continuation of application No. 11/676,735, filed on Feb. 20, 2007, now Pat. No. 7,957,563.

(30) Foreign Application Priority Data

Sep. 7, 2006 (JP) ................... 2006-242266

(51) Int. Cl.
*G06K 9/00* (2006.01)
*G05B 19/00* (2006.01)

(52) U.S. Cl. ......... 382/115; 382/124; 340/5.8; 340/5.83

(58) Field of Classification Search .............. 382/382, 382/124, 115, 125, 128, 100; 713/186, 185, 713/182; 345/158, 156, 157; 340/5.1, 5.8, 340/5.81, 5.82, 5.83, 5.51, 5.52, 5.53; 726/7, 726/3, 5; 250/200, 206, 555, 556; 600/300, 600/407, 476

See application file for complete search history.

(56) References Cited

U.S. PATENT DOCUMENTS

| | | | | |
|---|---|---|---|---|
| 5,737,439 | A | * | 4/1998 | Lapsley et al. ............ 382/115 |
| 5,787,185 | A | * | 7/1998 | Clayden ................... 382/115 |
| 6,668,071 | B1 | * | 12/2003 | Minkin et al. ............ 382/124 |
| 6,813,010 | B2 | | 11/2004 | Kono et al. |
| 7,359,531 | B2 | * | 4/2008 | Endoh et al. ............. 382/115 |
| 7,680,305 | B2 | * | 3/2010 | Miura et al. ............. 382/115 |
| 7,957,563 | B2 | * | 6/2011 | Kiyomizu et al. ........ 382/115 |
| 2002/0048014 | A1 | | 4/2002 | Kono |
| 2003/0016345 | A1 | | 1/2003 | Nagasaka |

(Continued)

FOREIGN PATENT DOCUMENTS

EP    1 533 759    5/2005

(Continued)

*Primary Examiner* — Sheela Chawan
(74) *Attorney, Agent, or Firm* — Antonelli, Terry, Stout & Kraus, LLP.

(57) ABSTRACT

A perfect non-contact type vein authentication apparatus is provided with a light source for emitting infrared light; an input interface equipped with an imaging unit for photographing a vein image of a living body by the infrared light emitted from said light source; a unit for controlling intensity of light to be illuminated; an image calculating unit for performing a feature extracting operation and a feature authenticating operation with respect to an image; and a positioning unit for presenting the living body. More specifically, the light source is provided in front of the living body. Both the light source and the imaging unit are installed in such a positional relationship that the light of the light source gives no adverse influence to the imaging unit. Also, the light source is installed in such a direction that the light of the light source gives no adverse influence to the imaging unit.

8 Claims, 9 Drawing Sheets

U.S. PATENT DOCUMENTS

| | | |
|---|---|---|
| 2004/0169938 A1 | 9/2004 | Nakamura |
| 2004/0184641 A1 | 9/2004 | Nagasaka |
| 2006/0072796 A1 | 4/2006 | Sano et al. |
| 2009/0074263 A1 | 3/2009 | Higuchi |

FOREIGN PATENT DOCUMENTS

| | | |
|---|---|---|
| EP | 1 655 697 | 5/2006 |
| JP | 2001-167255 | 6/2001 |
| JP | 2002-083298 | 3/2002 |
| JP | 2004-102993 | 4/2004 |
| JP | 2004-164652 | 6/2004 |
| JP | 2004-265269 | 9/2004 |
| JP | 2005-071118 | 3/2005 |
| JP | 2005-253988 | 9/2005 |
| JP | 2005-253989 | 9/2005 |
| JP | 2006-106978 | 4/2006 |
| WO | WO 01/22349 | 3/2001 |
| WO | WO 2006/050513 | 5/2006 |

* cited by examiner

INSTALLATION DIRECTION "α" (DEGREE) OF LIGHT SOURCE

PERSONAL IDENTIFICATION APPARATUS AND METHOD USING LIVING BODY

CLAIM OF PRIORITY

This application is a continuation of application Ser. No. 11/676,735, filed Feb. 20, 2007, now U.S. Pat. No. 7,957,563, which claims the priority from Japanese application JP 2006-242266 filed on Sep. 7, 2006, the disclosures of which are incorporated herein by reference.

BACKGROUND OF THE INVENTION

The present invention generally relates to a personal identification or authentication apparatus using living bodies. More specifically, the present invention is directed an apparatus for authenticating persons while utilizing blood vessel patterns acquired by imaging light which has transmitted through living bodies.

While a great interest has been given to security techniques with respect to personal properties and personal information. Specific attentions have been paid to biometric authentication techniques capable of performing authentication by utilizing living body information of individuals such as finger prints, irises, and veins, as personal authentication techniques having higher utilization. The biometrical authentication techniques have less risk of illegal uses caused by stolen, or lost products. Among these personal authentication techniques, finger vein authentication techniques capable of authenticating individuals by utilizing differences in blood vessel patterns of fingers own the following features. That is, since the finger vein authentication techniques never suppose criminal searches such as fingerprints investigation, the finger vein authentication techniques own less psychological resistance feelings. Also, since internal features of living bodies are utilized, there is a small risk of thefts.

Authentication using finger veins is realized in the below-mentioned manner. That is, when infrared light is illuminated to a finger, the illuminated infrared light is scattered in an interior portion of the finger, and thereafter, is radiated outside the finger. At this time, since hemoglobin contained in blood may largely absorb the infrared light, as compared with peripheral tissue of blood vessels, when the light which has transmitted through the finger is imaged, blood vessels distributed under the skin of this finger, namely, finger veins may be visualized as dark shadow patterns. While feature data of the finger vein patterns acquired from this image has been previously registered, a judgement is made as to whether or not a user corresponds to a registered person by acquiring a correlative relationship between the previously registered feature data and feature data of finger vein patterns which are acquired from an image of a presented finger so as to perform personal authentication.

In conventional finger vein authentication apparatuses, guide units for fixing positions of fingers have been installed therein in order that users can present their fingers in a better repeatability. Since the fingers are presented on the guide units, the repeatability characteristics of images of veins to be imaged are increased, so that high precision authentication can be carried out. Also, since the presentation positions of the fingers become stable, light from light sources can be firmly illuminated to the fingers, so that there is no possibility that strong light is leaked from peripheral portions of the fingers. As a result, sharp vein pattern images can be photographed. However, when authentication is carried out, the conventional finger vein authentication apparatuses must partially contact the own apparatuses to the fingers, and therefore, these conventional finger vein authentication apparatuses can be hardly used under such an environment that sanitation is of particular importance.

As an authentication apparatus capable of solving this problem, a personal authentication apparatus which acquires images of veins in a perfect non-contact manner so as to perform authentication is disclosed in JP-A-2002-83298 (corresponding to U.S. Pat. No. 6,993,160). Since positioning operations of fingers by being actually contacted to guide units cannot be carried out in such non-contact type authentication apparatuses, presentation positions of these fingers are easily varied, so that repeatability characteristics of photographed images are deteriorated. As a consequence, this non-contact type authentication apparatus is equipped with a v for correcting a rotation by employing a contour of a finger within a photographed image, and a unit for normalizing the photographed image while a position of a fingertip is defined as a reference. As a result, even in such a case that the position of the finger within the photographed image is varied, authentication can be correctly carried out.

SUMMARY OF THE INVENTION

However, problems which are caused by the variations of the presentation positions of the fingers are not limited only the deteriorations as to the repeatability characteristics of the finger positions within the photographed images. That is, in such an authentication apparatus that a presentation position of a finger is not stable, light emitted from a light source can be hardly and firmly illuminated only to the finger. As a result, such a strong light which should be originally illuminated to the finger is leaked to a peripheral portion of this finger, which may give an adverse influence to an imaging unit itself. For instance, when the strong and leaked light is illuminated to the imaging unit, this strong light is reflected on optical components such as a lens and a filter, so that shadows of these optical components are also imaged. Also, smear noise and the like with respect to imaging elements may sometimes occur. In this case, although the adverse influence given to the imaging unit by such a leaked light may be suppressed by weakening the light outputted from the light source, the light which has penetrated through the finger is similarly reduced. As a result, vein images of the finger cannot be acquired. As another method of preventing the adverse influence caused by the leaked light, such a method may be conceived. That is, a light shielding unit is installed on an input interface so as to shield the leaked light which is entered to an imaging unit. However, in the non-contact type authentication apparatuses, the presentation positions of the fingers may be easily varied, and there are some possibilities that the light shielding unit may shield not only the leaked light, but also shield the light which has transmitted through the fingers. As previously explained, since the light shielding unit may cause the problem in the acquisions of the vein images, such a light shielding unit cannot be installed.

An object of the present invention is to realize a perfect non-contact type vein authentication apparatus capable of being utilized under such an environment that sanitation is of very importance, and capable of acquiring a sharp vein image in such a manner that in order to perform personal authentication without giving a pressure feeling to a user due to a shape of the authentication apparatus, even when a presentation position of a living body is varied, while the presentation position of the living body is opened, light can be properly illuminated to the living body without illuminating thereto strong light leaked from a light source.

In order to achieve the above-explained object, the perfect non-contact type vein authentication apparatus is provided with a light source for emitting infrared light; an input interface equipped with an imaging unit for photographing a vein image of a living body by the infrared light emitted from the light source; a unit for controlling intensity of light to be illuminated; an image calculating unit for performing a feature extracting operation and a feature authenticating operation with respect to an image; and a positioning unit for presenting the living body. More specifically, the light source is provided in front of the living body. Further, the light source is installed in such a direction that the light of the light source gives no adverse influence to the imaging unit.

In accordance with the present invention, it is possible to realize the perfect non-contact type vein authentication apparatus capable of being utilized under such an environment that sanitation is of very importance, and also, capable of performing authentication without giving the pressure feeling to the user due to the shape of the authentication apparatus.

Other objects, features and advantages of the invention will become apparent from the following description of the embodiments of the invention taken in conjunction with the accompanying drawings.

DETAILED DESCRIPTION OF THE EMBODIMENTS

Referring now to drawings, various embodiments of the present invention will be described. It should be understood that although the present embodiments will especially explain a vein authentication apparatus of a finger, the inventive idea of the present invention may be applied to even such other living bodies, by which authentication is carried out by employing images, while these images are produced by that illuminated light passes through internal portions of living bodies such as a palm of a hand.

Embodiment 1

Figure 1A:
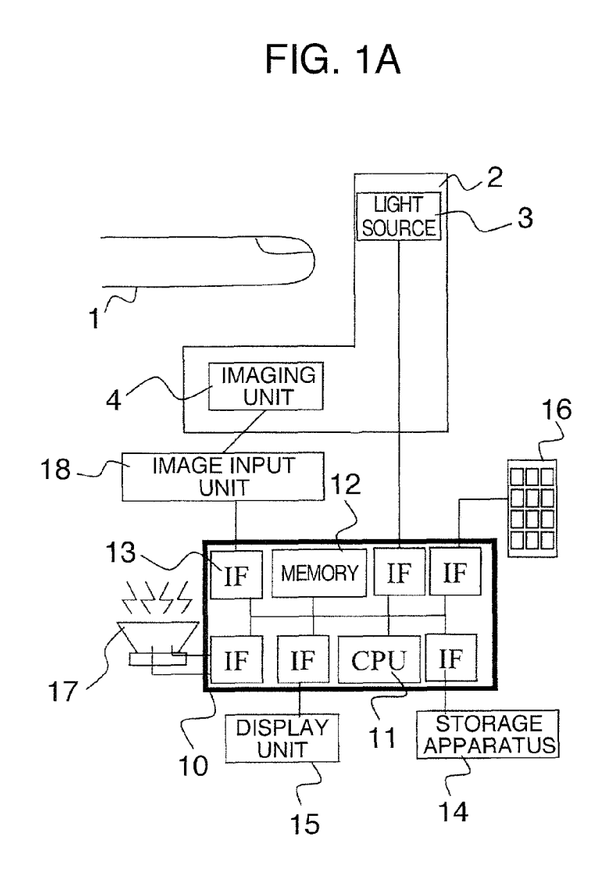
FIG. 1A and FIG. 1B schematically show an example of an arrangement of a finger vein authentication apparatus capable of realizing the present invention.
Figure 1B:
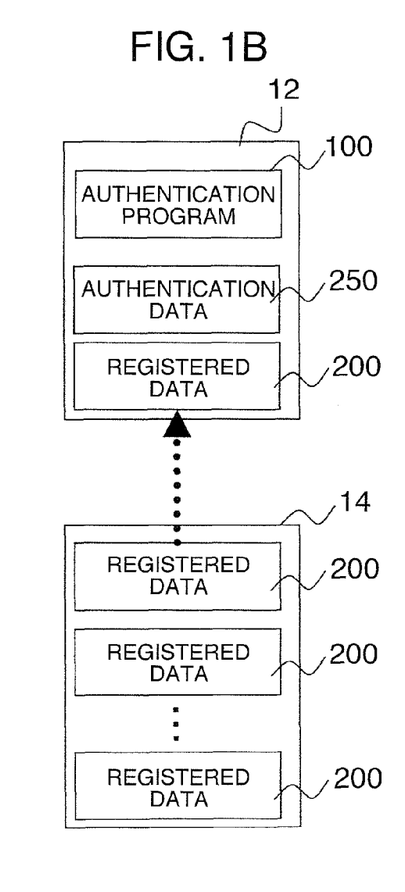

FIG. 1A is a schematic diagram for showing an arrangement of a non-contact type finger vein authentication apparatus which is capable of realizing the present invention. FIG. 1B indicates a memory 12 and a storage apparatus 14 of FIG. 1A in detail.

In the non-contact type finger vein authentication apparatus, an infrared light source 3 and an imaging unit 4 are provided in an input interface 2 of a finger vein pattern, while the input interface 2 corresponds to a portion where a user presents his, or her finger. When the user presents her finger 1 to the input interface 2, light is illuminated from the light source 3 with respect to the finger 1. The light is scattered within the finger 1, and then, light which has penetrated the finger 1 is imaged by the imaging unit 4. The light is converted into an electric signal by the imaging unit 4, and then, the electric signal is acquired via an image input unit (or an image capture unit) 18 to an authentication processing unit 10 as an image. The acquired image (or captured image) is stored via an interface 13 into the memory 12. Also, registered data 200 which has been previously registered is stored in the memory 12 of the authentication processing unit 10 by the storage apparatus 14. At this time, the registered data 200 as to a plurality of registration persons may be stored in the memory 12. Alternatively, only such a registered data 200 corresponding to information (for instance, user ID) entered by an input unit 16 may be stored in the memory 12. A CPU (Central Processing Unit) 11 produces authentication data 250 from an input image in accordance with an authentication program 100 stored in the memory 12 in order that the produced authentication data 250 is authenticated with the registered data 200. In the authentication process operation, a correlative value between two pieces of data for comparison is calculated, and then, a judgement is made as to whether or not the authentication data 250 is made coincident with such a data which has been registered in response to this calculated correlative value. In response to the judgement result, an individual is authenticated. The authentication result is displayed on a display unit 15. Otherwise, since voice is reproduced from a speaker 17, the authentication result is transferred to the user. In the case that the authentication is correctly performed, a process operation during authentication is carried out with respect to a control subject of an authentication system.

Figure 2:
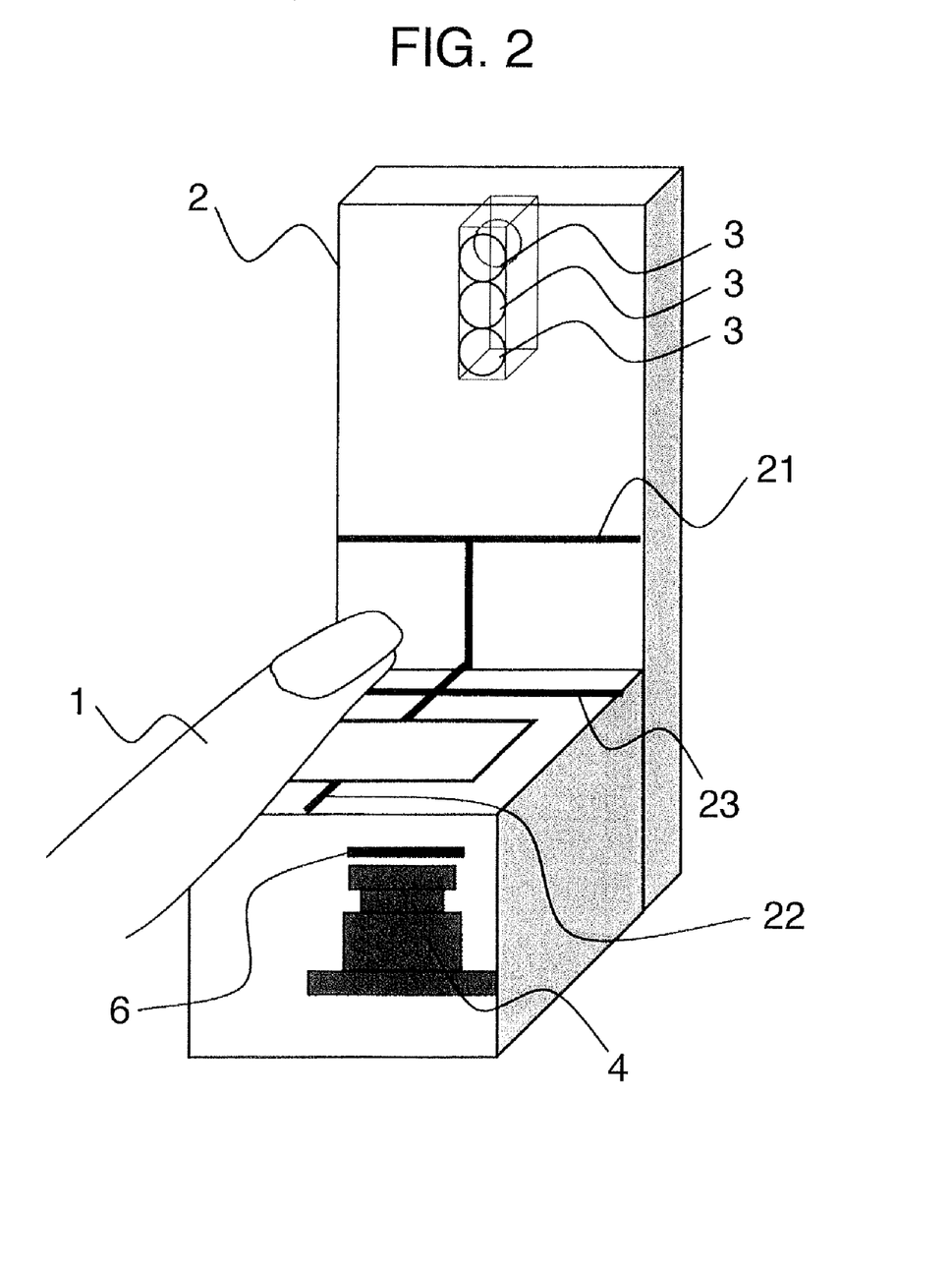
FIG. 2 illustratively indicates one structural example as to an input interface of the finger vein authentication apparatus capable of realizing the present invention.

FIG. 2 illustratively shows a structural example as to an input interface 2 of a non-contact type finger vein authentication apparatus capable of realizing the present invention. It should be understood that in the below-mentioned explanation and Claims, a finger presentation position is located at a higher position than an imaging unit, and a light source is located at a further higher position than the above-explained finger presentation position. However, this condition is conducted in order to achieve an easy understanding. If a desirable effect may be obtained while maintaining a relative positional relationship among the imaging unit, the finger presentation position, and the light source, and also a light incident angle relationship, then other installation modes may be covered by the inventive idea of the present invention, namely, the entire unit is installed at a different angle (for example, entire unit is inclined on the user side), and a deep wall on which the light source is installed is defined at an angle other than 90 degrees with respect to the imaging unit.

Since the finger 1 of the user is held up to the input interface 2, the input interface 2 acquires a vein image of the finger 1. In order to photograph vein patterns of the palm side when the finger 1 of the user is held up to the input interface 2, the imaging unit 4 is installed on the lower side (namely, palm side of hand) of the presentation position of the finger. A filter 6 which may pass only infrared light has been installed on the imaging unit 4 in order to cut off unwanted light. In order to acquire sharper vein images, the light source 3 is installed at a position (namely, back side of hand) which is higher than the presentation position of the finger 1.

At this time, if a light source is installed just above a finger, then a representation position of the finger is brought into a close mood due to a structural article used to install the light source, so that psychological resistance feelings of a user is increased. In order to avoid this psychological resistance feeling, the light source is installed above a side surface of a finger, or in a front/upper direction on the side of fingertips. In the embodiment 1, the light source 3 is installed in the front/upper directions of the representation position of the finger 1. As a result, an upper space of the finger 1 can be set to an open mood, so that the psychological resistance feelings can be reduced, while a user feels the psychological resistance feelings when the user presents her finger to the closed space.

If a light source is installed above a side surface of a finger, then light illuminated from the light source toward the finger strongly illuminates a wide area on the side surface side of the finger. As a result, a vein pattern contained in transmission light is canceled by this illuminated light, so that contrast of the vein image is lowered. On the other hand, in such a case that the light source is installed in front of the fingertip side, only such a narrow area in the vicinity of the fingertip is merely illuminated, so that the contrast of the vein image is hardly lowered. This problem may be also solved by way of the method for installing the light 3 according to the embodiment 1.

However, as explained above, when the light source 3 is installed in front of the finger 1, the light can be hardly reached to the root side of the finger 1, as compared with other finger portions. In order to acquire a sharp vein pattern, it is important that an amount of light illuminated to the finger 1 is made uniform, and thus, an image having a small luminance fluctuation is photographed. As a consequence, the following light source setting method is desired. That is, while plural pieces of the light sources 3 are installed, a light amount of such a light source 3 is decreased, whose illumination portion is positioned near the fingertip, whereas a light amount of such a light source 3 is increased, whose illumination portion is located on the side of the finger root. In the embodiment 1, the plural light sources 3 are independently controlled in order that the light amount reached to the finger 1 may become uniform. Alternatively, the light amounts may be previously adjusted in such a manner that the light amount of the light sources 3 for illuminating the root side of the finger 1 is increased with respect to the light amount of the light sources 3 for illuminating the fingertip side, and the plural light sources may be controlled at the same time. As a result, the control operation may be simplified. The light sources 3 may be arranged not only in one row along the longitudinal direction, but also arranged in a plane shape. As a consequence, the allowable range of the presentation position may be widened along the right/left directions. In the case that the light sources 3 are arranged in the plane shape, the light sources 3 may be alternatively controlled in such a manner that a presentation position of the finger 1 is sensed by employing a photographed image, and only such a light source 3 located in front of the finger 1 is turned ON. As a result, power consumption of the authentication apparatus may be suppressed.

A line 21 to another line 23 are provided on the surface of the input interface 2 as a guide used to determine a presentation position of the finger 1. The user determines the presentation position of the finger 1 in such a way that a height of the finger 1 is coincident with the line 21; a center line of the finger 1 is coincident with the line 22, and a position of a fingertip of the finger 1 is coincident with the line 23. Since this guide is provided, the finger 1 can be presented while the user confirms the position of the own finger 1 during authentication. As a result, the repeatability of the presentation position may be increased. Alternatively, dots may be formed at the corresponding positions instead of the lines 21 to 23.

As previously explained, a non-contact type authentication apparatus owns the following problem: That is, when a positional shift of a finger happens to occur, strong light emitted from a light source is entered into an imaging unit, so that a sharp image cannot be acquired. In this embodiment 1, the illumination direction of the light source 3 is adjusted in order that the presented finger 1 is illuminated by the light, and further, such a storage light which may give an adverse influence to the imaging unit 4 is not entered to this imaging unit 4. Concretely speaking, as shown in FIG. 3A, the light source 3 is installed in such a direction along which the light illuminates the left-sided portion from the imaging unit 4.

Next, a description is made of a method for determining the direction for installing the light source 3, while this direction determining method can guarantee that a sufficiently high quality of an image can be photographed even in such a case that such a light is directly entered to the imaging unit 4 due to positional shifts of the finger 1, which this light should originally penetrate through the finger 1 and thereafter should be reached to the imaging unit 4.

A first explanation is made of such a direction that the strong light is not entered to the imaging unit 4. When the strong light is reached to the imaging unit 4, smear noise is produced with respect to imaging elements. Otherwise, the strong light causes reflections on an optical component such as a lens and a filter, sot that images of these optical components are photographed. More specifically, the noise caused by photographing the component may easily occur even in such a case that a light amount of the strong light is small. As a consequence, since the amount of noise caused by the photographed components within the photographed image is investigated, it is possible to confirm as to whether or not such a light which may give an adverse influence is reached to the imaging unit 4. In order to acquire influence degrees of this noise, the below-mentioned experiment was carried out.

Figure 3A:
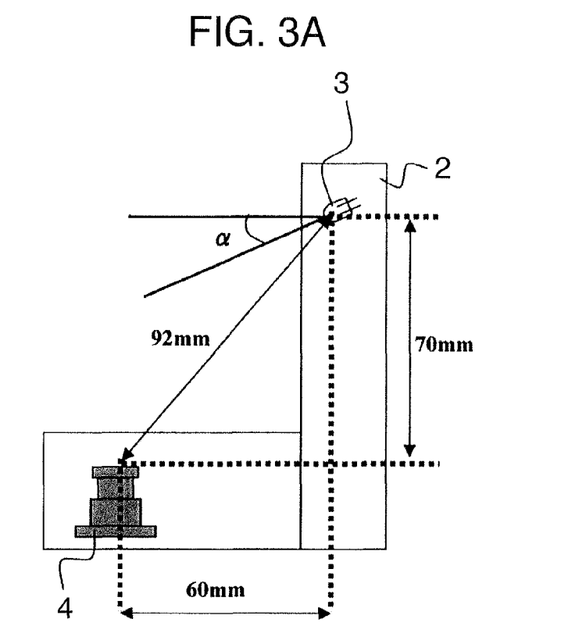
FIG. 3A and FIG. 3B are explanatory diagrams for representing an installation method of a light source.

FIG. 3A shows an arranging diagram of components of an apparatus used in this experiment. As the light source 3, an LED (Light Emitting Diode) whose directivity is 15 degrees and whose rated power is 100 mw/Sr was employed. Also, the light source 3 owns such a construction that an angle "α" defined between an imaging plane and an illumination direction of the light source 3 may be moved within a range from zero degree to 90 degrees.

Firstly, the light amount of the light source 3 was set to 100 mw/Sr corresponding to the rated power of this LED. Next, while the angle "α" was varied from zero degree up to 90 degrees, a space located above the imaging unit 4 was photographed by this imaging unit 4. Since the above-explained experiment owns such a purpose to check influences of light when a presentation position of a finger is largely shifted, the photographing operations were carried out under such a condition that the position of the finger was shifted in the largest degree, namely under such a condition that the finger was not presented over the apparatus. Thereafter, a feature amount extracting process operation (step S109: will be explained later) was applied with respect to the photographed image. The feature amount extracted by this process operation of the step S109 was defined as an amount of noise. In order to investigate how degree this noise may give an influence to authentication, such a ratio of the noise amount to an amount of a vein pattern was defined as an influence degree of the noise. The amount of the vein pattern has been acquired in such a manner that a finger vein image was actually photographed by the above-described apparatus, and then, the photographed image was processed by the feature extracting process operation.

Figure 3B:
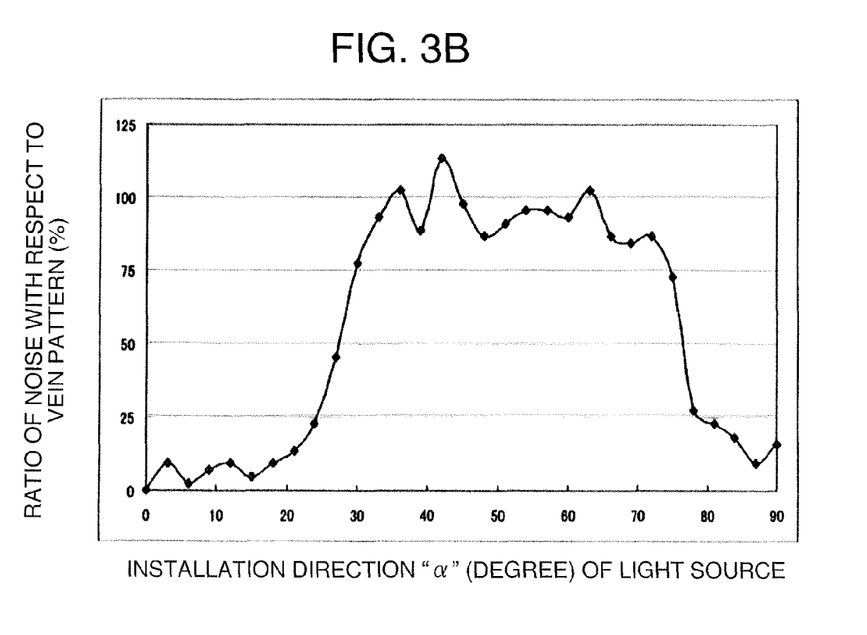

FIG. 3B is a graph for graphically representing a relationship between the installation direction "α" of the light source 3 and the influence degree of the noise generated by the light of the light source 3. From this graphic representation, the following fact can be revealed. That is, when the value of "α" is small and the value of "α" is approximated to 90, the ratio of the noise with respect to the vein pattern is small, whereas the ratio of the noise with respect to the vein pattern is large in other cases. The larger this noise ratio becomes, the larger the adverse influence may be given to the authentication result. In general, in vein authentication, if a noise amount exceeds approximately 25%, then the vein authentication cannot be correctly carried out. As a result, in the embodiment 1, the light source 3 is installed at an angle that a noise amount may be suppressed lower than, or equal to 25%. As apparent from the graph of FIG. 3B, if the angle is selected to be lower than, or equal to 24 degrees, and higher than, or equal to 81 degrees, then the noise may be suppressed smaller than, or equal to 25%. As a consequence, in such a case that both a camera and a light source are installed such a position as shown in FIG. 3A, this light source is installed in such a manner that the angle "α" becomes lower than, or equal to 24 degrees, or higher than, or equal to 81 degrees. As a result, even when the presentation position of the finger is shifted, the adverse influence caused by the light source 3 can be suppressed, so that the image having the sufficiently high quality can be photographed.

Next, a description is made of a direction of a light source which illuminates light with respect to a presented finger within angles which do not give an adverse influence to an imaging unit. When the angle "α" is higher than, or equal to 81 degrees, the light emitted from the light source 3 illuminates a right-sided portion from the imaging unit 4. As a result, such a light having a sufficiently large amount capable of acquiring a vein image cannot be reached to the finger 1 which is presented above the imaging unit 4. On the other hand, when the direction of the light source 3 is adjusted in such a manner that the angle "α" becomes smaller than, or equal to 24 degrees, such a light having a large amount may be reached also to a space located above the imaging unit 4, so that a finger vein image can be acquired.

As apparent from the foregoing explanation, in the case that the light source 3 and the imaging unit 4 are installed based upon such a positional relationship as shown in FIG. 3A, it is preferable to install the light source 3 in such a way that the angle "α" becomes smaller than, or equal to 24 degrees. As a result, such an input interface can be realized in that the finger 1 may be illuminated by the light, and further, the strong light is not entered to the imaging unit 4. In particular, if the direction of the light source 3 is adjusted in such a manner that the angle "α" becomes equal to 24 degrees, then the ratio of the light amount illuminated to the finger 1 with respect to the light amount outputted from the light source 3 becomes the largest ratio, so that the power consumption can be suppressed.

Furthermore, if another expression is made, then the light emitted from the light source 3 is entered to the presented finger 1, and then, the transmission light from this finger 1 is entered to the imaging unit 4. If the direction of the light source 3 is set in such a manner that the direct light (major portion of direct light) emitted from the light source 3 is not entered to the imaging unit 4, then it is possible to avoid that the input of the imaging unit 4 is saturated.

Figure 4:
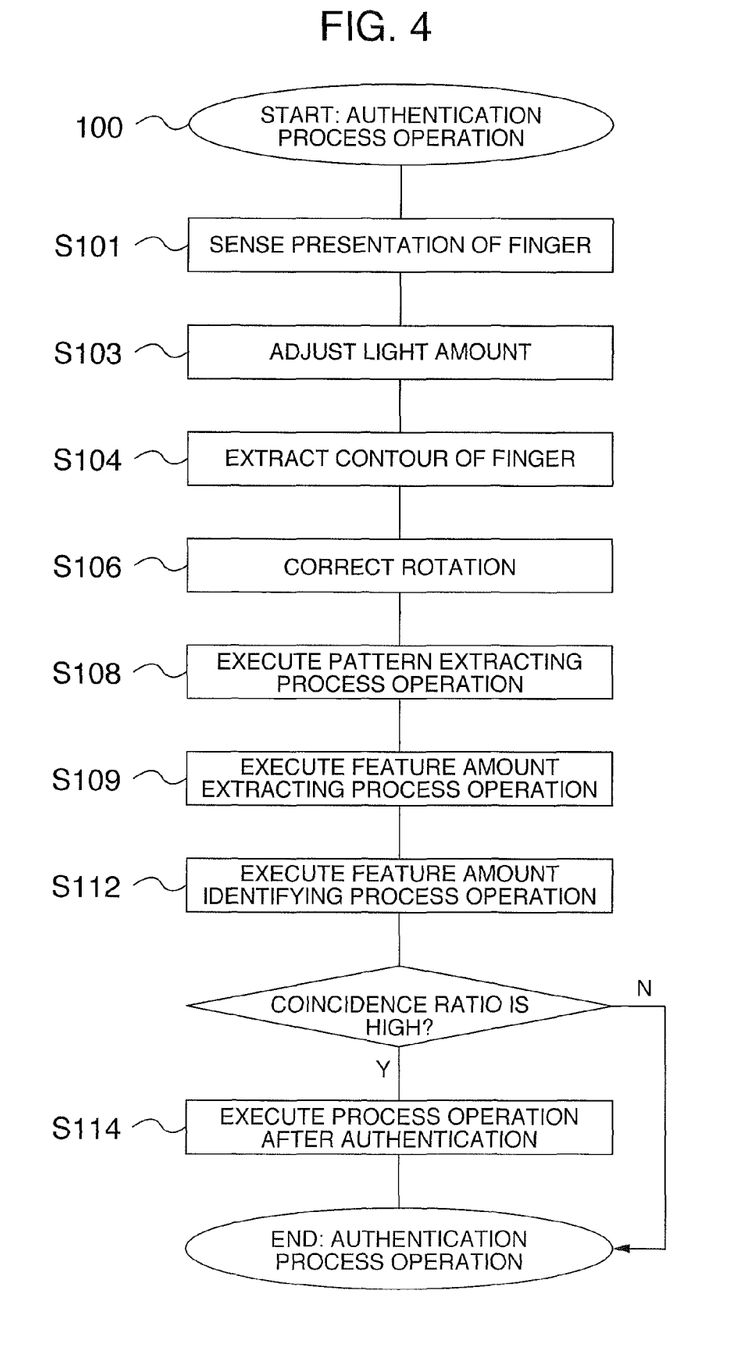
FIG. 4 shows a flow chart for explaining authentication process operations of the finger vein authentication apparatus.

Referring now to FIG. 4, a description is made of an embodiment of process sequential operations which are executed in accordance with the authentication program 100.

In the beginning, a process operation for sensing a presentation of the finger 1 is carried out (step S101). In order to acquire a vein image by the input interface 2, it is required that the finger 1 must be presented at a lower position than the light source 3. As will be explained, as a method capable of sensing that the finger 1 is presented at a proper height, as will be explained, the following methods may be utilized, namely, a method by which plural pieces of light emitted from a plurality of light sources are illuminated to the finger 1 so as to calculate a height of the finger 1 based upon the illumination position thereof; another method by which while another light source installed in such a manner that an image of the light source may be photographed by the imaging unit 4 at the same height as the light source 3 is continuously turned ON, such a condition that light is shielded by the finger 1 is sensed; and the like may be employed.

When the presentation of the finger 1 is sensed, the light amount of the light source 3 is adjusted in such a manner that the sharpest image may be obtained (step S103). In this adjusting operation, the following methods may be employed, namely, a method by which while an averaged luminance value of an image is continuously monitored, the light amount is used in a feedback control operation in response to the monitored value; another method by which while an evaluation function for judging a sharp degree of a pattern is applied with respect to an image of a finger vein pattern, a light amount is adjusted in such a manner that the evaluation function-applied result may be optimized; and the like may be employed.

Next, a contour of the finger 1 is detected (step S104). As the contour detecting method, the following methods are provided, namely, a method for emphasizing an edge of an image; a method for tracing an edge portion; and the like may be employed.

After the contour of the finger 1 has been detected, a parallel direction is corrected, or a rotation direction within a plane is corrected (that is, normalization of the finger angle: step S106). There is such a method that a direction of the finger 1 along a longitudinal direction is predicted, and an image of the finger 1 is rotated in such a manner that an angle thereof becomes constant. Next, a feature extracting process operation of a blood vessel pattern (that is, the extraction of a finger-vain pattern) is carried out (step S108). As this feature extracting method, the following methods may be employed, namely, a method for employing an edge emphasizing filter, or a matched filter in order to emphasize a line section; a method for extracting a local concave position in a sectional profile of an image; and the like may be employed.

Thereafter, a feature amount is extracted from either the extracted blood vessel pattern or the emphasized blood vessel pattern (step S109). The following methods may be employed, namely, a method for extracting an image itself as the feature amount; a method for detecting either a branching point or an edge point as the feature amount; and the like may be employed.

Finally, the produced feature amount is compared with a feature amount which has been previously registered (that is, a pattern matching: step S112). In the case that images themselves are employed as the feature amount, the images are overlapped with each other, and pixel values thereof are compared with each other so as to calculate a coincidence rate. In the case that the branch points and the edge points are employed as the feature amount, such information as to positions of these branch and edge points, total numbers thereof, an angle of a branch line, and a correlative distance is compared with each other so as to calculate a coincidence rate. A judgement is made as to whether the blood vessel patterns are identical to each other, or are different from each other based upon the calculated coincidence rate. It should be understood that a threshold value for this judgement may be previously calculated in a statistical manner. When the calculated coincidence rate becomes higher than the threshold value, it is so judged that the user is the registered person. To the contrary, when the calculated coincidence rate becomes lower than the threshold value, it is so recognized that such a finger which has not been registered is presented, so that the authentication is refused.

In such a case that the user is judged as the registered person, such a process operation after the authentication that a door is opened is carried out (step S114).

Embodiment 2

Figure 5A:
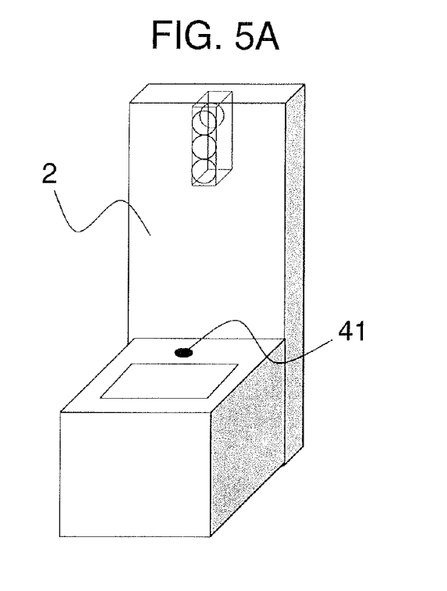
FIG. 5A and FIG. 5B illustratively show one structural example as to input interfaces equipped with a finger positioning-purpose air blowing unit.
Figure 5B:
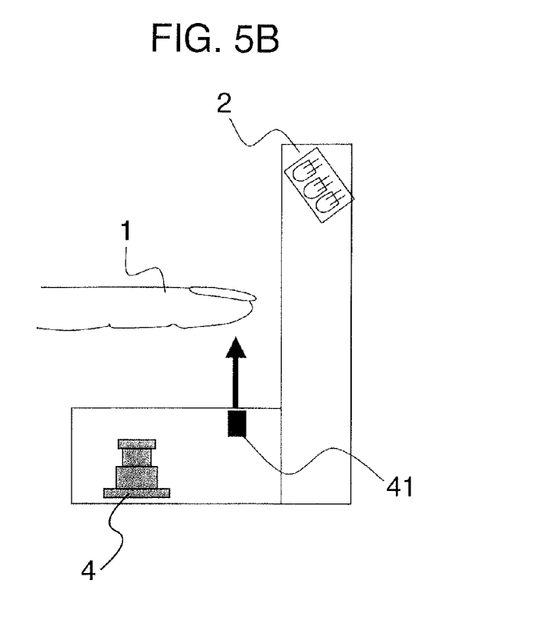

FIG. 5A and FIG. 5B show one structural example as to an input interface 2 of a non-contact type finger vein authentication apparatus which is provided with an air blowing unit 41 for positioning a finger 1. FIG. 5A is a schematic diagram for showing the input interface 2, and FIG. 5B is a side view for representing the input interface 2.

As indicated in FIG. 5A and FIG. 5B, the air blowing unit 41 is installed at a lower portion of a fingertip of a finger presentation position in the input interface 2. When the presentation of the finger 1 is sensed, an air blowing operation is commenced from the air blowing unit 41 along vertical/upper directions. A user holds the finger 1 up to a position where air blows the fingertip, so that the user can determine the presentation position of the finger 1 while the finger 1 is not directly touched to the input interface 2. As a result, a vein image of the finger 1 can be photographed with high repeatability, so that the authentication precision can be increased. Also, since the user can easily grasp the presentation position of the finger 1 in the sense of touch, the utilization of the non-contact type finger vein authentication can be improved.

The air blowing unit 41 may be installed not only at the position of the fingertip, but also at a lower portion on the side of a root of the finger 1. As a result, the positioning operations of the finger 1 may be realized at two positions, namely, the fingertip position and the finger root position, which may avoid a rotation of the finger 1. Furthermore, the air blowing unit 41 for determining the presentation height of the finger 1 may be alternatively installed within a front wall plane as to the finger 1 so as to blow air forward the fingertip. If plural sets of the air blowing unit 41 for the positioning purpose are installed, then variations in the presentation positions of the finger 1 may be furthermore suppressed. As a result, authenticating operation may be alternatively carried out in a more stable manner.

Embodiment 3

Figure 6A:
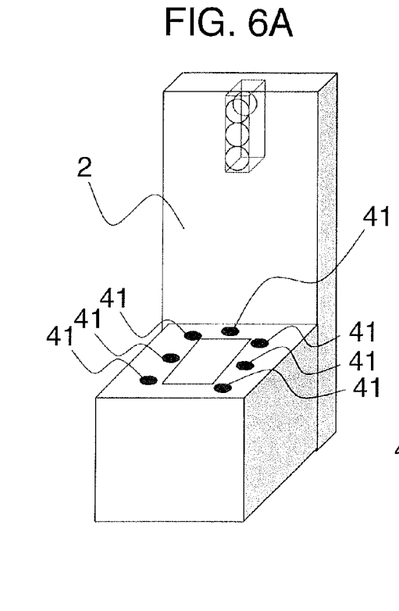
FIG. 6A and FIG. 6B illustratively show another structural example as to input interfaces equipped with a finger positioning-purpose air blowing unit.
Figure 6B:
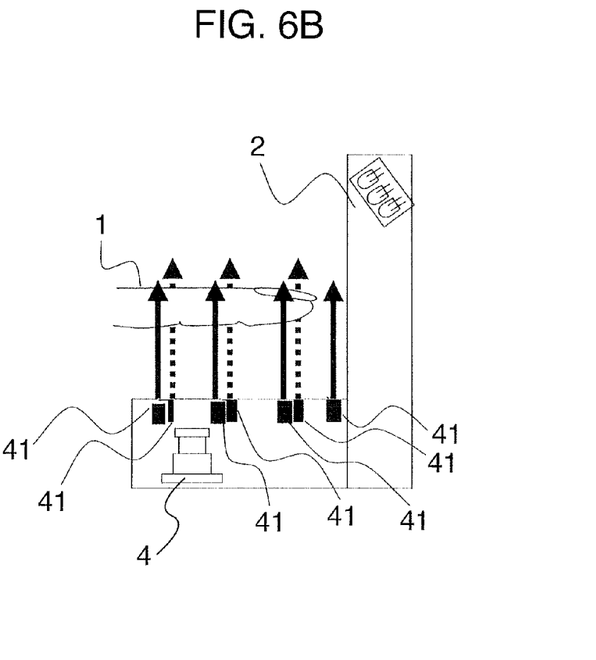

FIG. 6A and FIG. 6B show one structural example as to an input interface 2 of a non-contact type finger vein authentication apparatus which is provided with an air blowing unit 41 for positioning a finger 1. FIG. 6A is a schematic diagram for showing the input interface 2, and FIG. 6B is a side view for representing the input interface 2.

As indicated in FIG. 6A and FIG. 6B, the air blowing unit 41 is installed in such a manner that the air blowing unit 41 surrounds a finger presentation position of the finger 1 in the input interface 2. When the presentation of the finger 1 is sensed, an air blowing operation is commenced from the air blowing unit 41 along an upper direction. In such a case that the presentation of the finger 1 is shifted from a predetermined position, this wind blows the finger 1. The user moves her finger 1 in order to escape from the wind. Since the user moves her finger 1 in such a manner that all of wind from the air blowing unit 41 does not blow her finger 1, this finger 1 may be naturally conducted to the correct presentation position. As previously explained, the positional shift of the finger 1 along the right/left directions and the rotation of the finger 1 within the horizontal plane can be prevented by such a natural action that the finger 1 escapes from the wind.

Embodiment 4

Figure 7A:
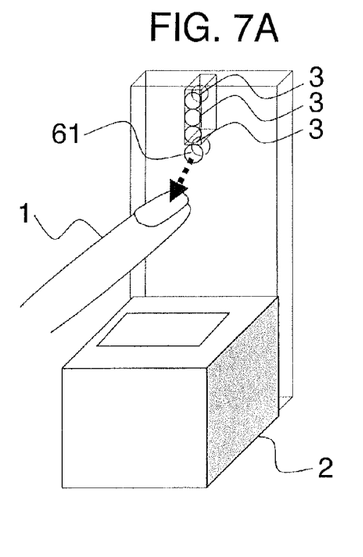
FIG. 7A and FIG. 7B illustratively show one structural example as to input interfaces equipped with a finger positioning-purpose visible light source.
Figure 7B:
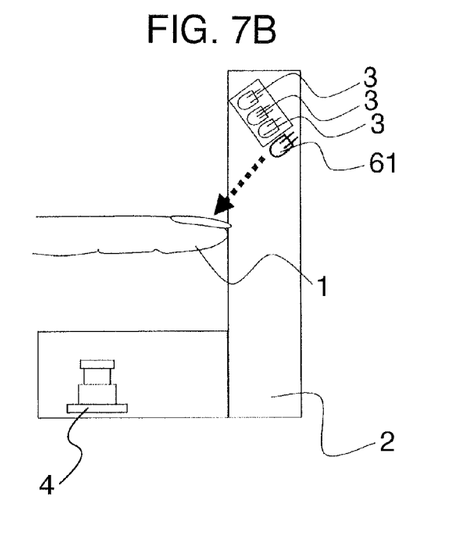

FIG. 7A and FIG. 7B show one structural example as to an input interface 2 of a non-contact type finger vein authentication apparatus which is provided with a visible light source 61 for positioning a finger 1. FIG. 7A is a schematic diagram for showing the input interface 2, and FIG. 7B is a side view for representing the input interface 2.

The visible light source 61 for instructing a presentation position of the finger 1 is installed within a wall plane located in front of the finger 1. The user presents her finger 1 at such a position that visible light illuminated from the visible light source 61 lights a predetermined portion of the finger 1, for instance, a center portion of a nail and a joint, so that the user performs a positioning operation of her finger 1. As previously explained, since the user performs the positioning operation by utilizing the visible light, the user can hold her finger 1 up to the stable position every time the positioning operation is carried out, while the user does not directly touch the input interface 2. As a result, the authentication precision can be improved. In this embodiment 4, both the visible light source 6 and the infrared light source 3 may be alternatively constituted as a single light source by utilizing an LED capable of emitting light having a plurality of wavelengths.

Embodiment 5

Figures 8A, 8B:
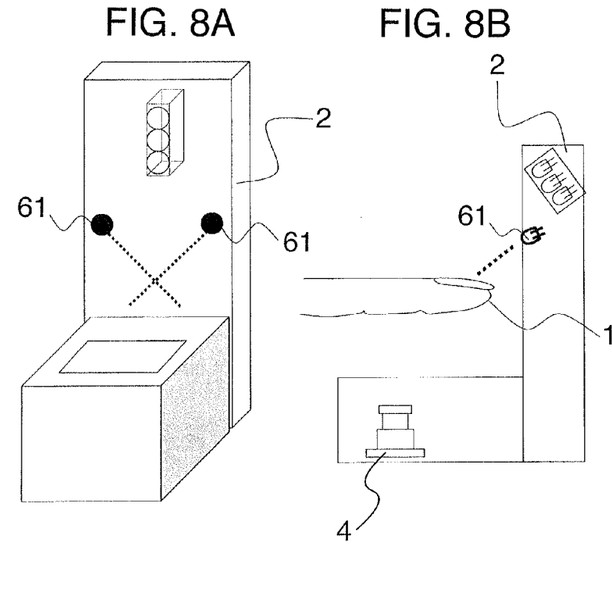
FIG. 8A to FIG. 8C illustratively show one structural example as to input interfaces equipped with a plurality of finger positioning-purpose visible light sources.
Figure 8C:
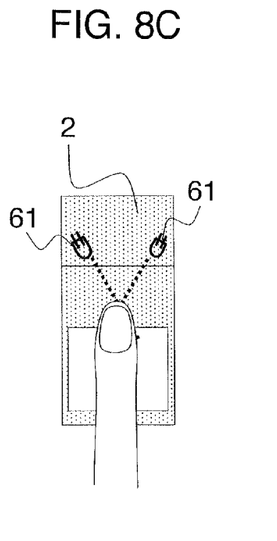

FIG. 8A to FIG. 8C show one structural example as to an input interface 2 of a non-contact type finger vein authentication apparatus which is provided with a plurality of visible light sources 61 for positioning a finger 1. FIG. 8A is a schematic diagram for showing the input interface 2, FIG. 8B is a side view for representing the input interface 2, and FIG. 8C is an upper view for indicating the input interface 2.

As represented in FIG. 8A to FIG. 8C, two sets of the visible light sources 61 are installed along an upper direction and in front of the finger 1. Two pieces of visible light emitted from the respective light sources 61 are illuminated toward the inner side in such a manner that two pieces of the visible light are intersected at a presentation position of a fingertip of the finger 1. The user holds her finger 1 up to the visible light emitted from the two light sources 61 in such a manner that two pieces of the visible light are lighted on a predetermined finger portion such as a nail and a joint in an overlap manner, so that the user may determine the presentation position of the finger 1. If light emitted from a plurality of light sources is utilized as a guide for the presentation position of the finger 1, then the presentation position of the finger 1 may be exclusively determined along the upper/lower directions in addition to the right/left directions. As a result, the positional shifts of the finger 1 can be reduced, so that the authentication can be improved.

Embodiment 6

Figure 9A:
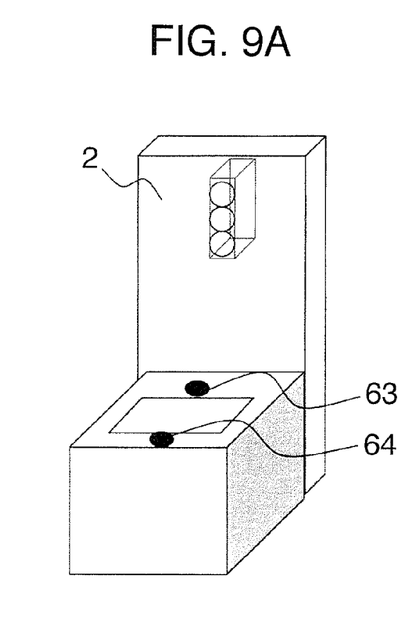
FIG. 9A to FIG. 9E illustratively show one structural example as to input interfaces equipped with light sources used to sense heights of fingers.
Figure 9B:
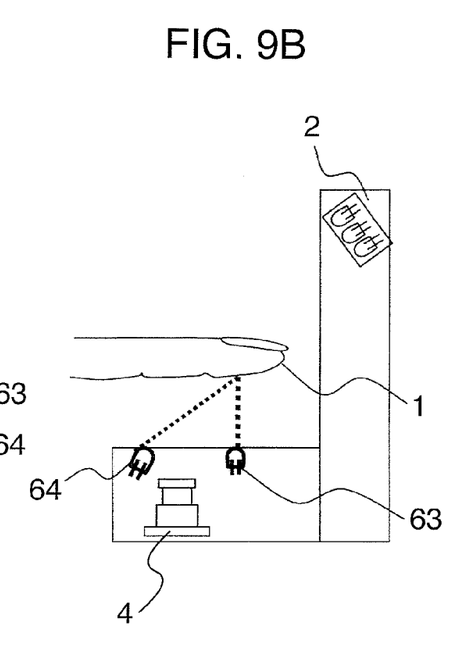
Figure 9C:
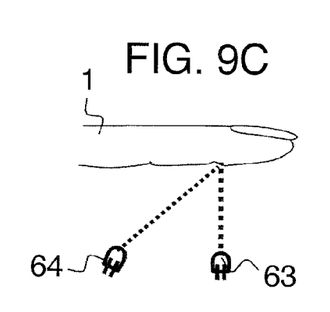
Figure 9D:
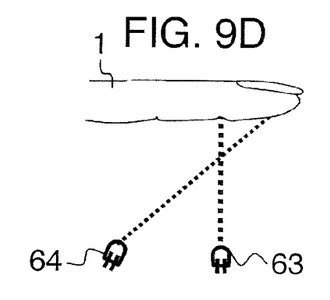
Figure 9E:
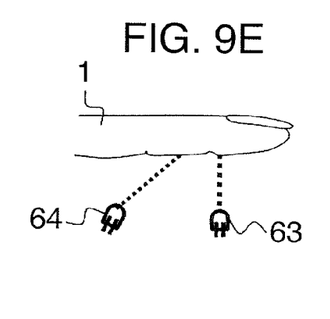

FIG. 9A to FIG. 9E show one structural example as to an input interface 2 of a non-contact type finger vein authentication apparatus which calculates a height of a finger 1 by utilizing a plurality of infrared light sources 63 and 64. FIG. 9A is a schematic diagram for showing the input interface 2, and FIG. 9B is a side view for representing the input interface 2. Also, FIG. 9C to FIG. 9E are diagrams for indicating changes in positions which are illuminated by infrared light from the infrared light sources 63 and 64 when a position of the finger 1 along the upper/lower direction is changed.

As shown in FIG. 9A, the infrared light source 63 is installed at a lower portion on the side of a fingertip of the finger 1, and the infrared light source 64 is installed at a lower portion on the side of a root of the finger 1 within the input interface 2 so as to sense a presentation position of the fingertip. As indicated in FIG. 9B, two sets of the infrared light sources 63 and 64 are installed in such a direction that two pieces of infrared light from the respective infrared light sources 63 and 64 are intersected with each other at a proper presentation position of the fingertip of the finger 1. When the user holds her finger 1 up to the input interface 2, the two light sources 63 and 64 strongly illuminate a palm side of the fingertip. At this time, when the finger 1 is photographed by the imaging unit 4, the illuminated portion appears as points. In the case that the finger 1 is presented at the correct position, as represented in FIG. 9C, two pieces of the infrared light from the two infrared light sources 63 and 64 are illuminated on the same position of the palm-sided surface of the finger 1, so that two points are overlapped with each other. In such a case that the finger 1 is presented at a position higher than the correct presentation position, as indicated in FIG. 9D, the light emitted from the light source 64 is illuminated on the fingertip side with respect to the light emitted from the light source 63. Conversely, in such a case that the finger 1 is presented at a position lower than the correct presentation position, as indicated in FIG. 9E, the light emitted from the light source 64 is illuminated on the side of the root of the finger 1 with respect to the light emitted from the light source 63. As a consequence, positions of points where two pieces of the light are reflected are detected by performing an image processing operation, so that the heights where the finger 1 is presented can be automatically calculated.

At this time, it is required to discriminate that points of the surface of the finger 1 are produced by which infrared light emitted from any one of these two infrared light sources 63 and 64. This discrimination may be realized by conducting a method for illuminating two pieces of light having different dimensions, or different shapes from the light source 63 and the light source 64; a method for shifting turn-ON timing of the light source 63 from turn-ON timing of the light source 64; and like.

As previously explained, since the plural light sources are utilized, the presentation position of the finger 1 can be grasped. As a result, the non-contact type finger vein authentication apparatus can confirm that the finger 1 is presented at the correct position and then can authenticate the finger 1. Also, the non-contact type finger vein authentication apparatus may guide the user by employing the information as to the calculated presentation position of the finger.

As a guiding method, the following methods may be employed, namely, a method for installing such an LED in the input interface 2 that this LED indicates that the finger may be moved along either the upper direction or the lower direction; another method for indicating a move direction on the display unit 15; and the like may be employed. As a result, the user can present the finger under better repeatability, so that the authentication precision can be improved.

Embodiment 7

Figure 10:
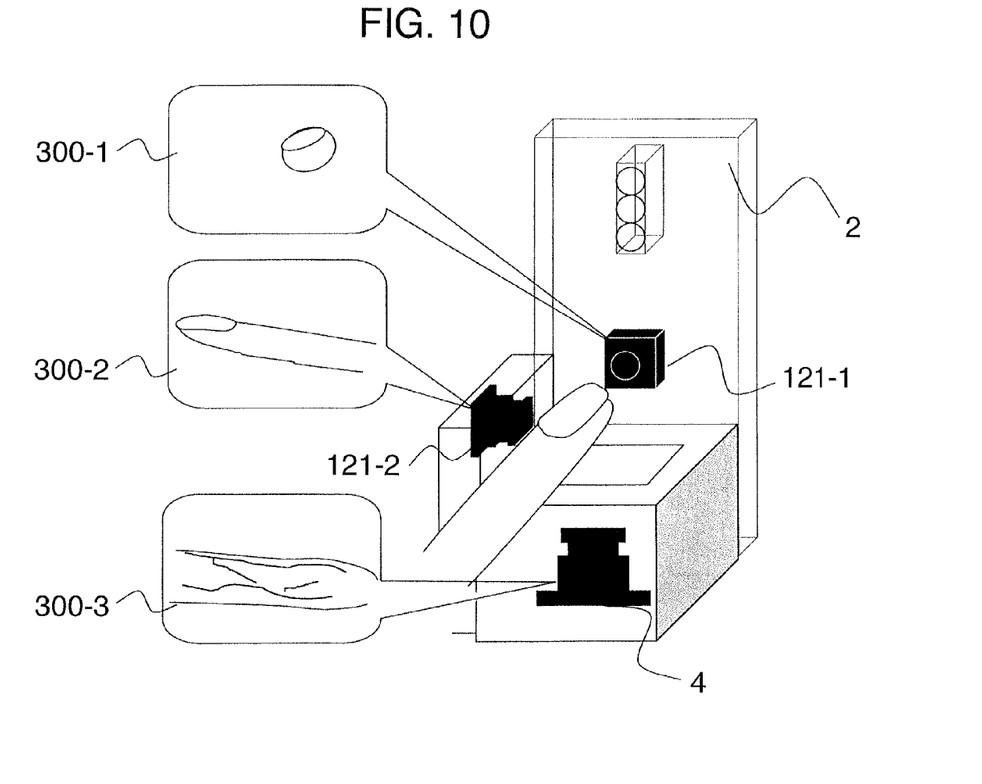
FIG. 10 illustratively represents one structural example as to an input interface in which a plurality of imaging units are installed.

FIG. 10 shows one structural example as to an input interface 2 of a non-contact type finger vein authentication apparatus which is provided with imaging units 121-1 and 121-2 capable of sensing a position of a finger 1 and a rotation thereof. As indicated in FIG. 10, the imaging unit 121-1 for photographing the finger 1 from a front view thereof is installed in a wall installed on a front plane of the finger 1, and the imaging unit 121-2 for photographing the finger 1 from a side view thereof is installed in another wall installed on a side plane of this finger 1.

In the authentication apparatus shown in this embodiment 7, when the user presents the finger 1 on the input interface 2, there are some possibilities that a presentation position of the finger 1 may be varied, or rotated. Among these problems, a positional shift and a rotation of the imaging unit 4 within the imaging planes can be corrected by executing a rotation correcting process operation with employment of contour information. However, when the finger 1 is held on the input interface 2, not only the rotation of the imaging unit 4 within the imaging plane may occur, but also axial rotations with respect to a long axis and a short axis of the finger may occur, and further, positional shifts of the finger 1 along upper/lower directions, right/left directions, and front/rear directions may occur. To solve these problems, the above-explained imaging units 121-1 and 121-2 are installed in addition to this imaging unit 4 in order that the user can present her finger 1 under better repeatability. When the user presents her finger 1, a front surface image 300-1 of the finger 1 and a side surface image 300-2 of this finger 1 are photographed by the imaging unit 121-1 and the imaging unit 121-2 respectively. While a plurality of images acquired at this time are utilized, a three-dimensional positional shift and a rotation of the finger 1 are sensed, so that the authentication apparatus guides the user based upon the sensed rotation and three-dimensional positional shift. Next, an example as to a method for sensing a position and a rotation of the finger 1 is indicated.

Firstly, the image 300-1 photographed from the front surface of the finger 1 is employed so as to detect a position of the finger 1 along the right/left directions and another position thereof along the upper/lower directions, and also, to detect an axial rotation with respect to the long axis of the finger 1. In order to acquire the positions of the finger 1 along the upper/lower directions and the right/left directions, an area of the finger 1 is extracted from the photographed image 300-1. As the extracting method, the following methods may be employed, namely, a method for emphasizing an edge of an image; another method for tracing an edge portion; and the like may be employed. A central position of the extracted finger area is calculated so as to define this calculated central position as a presentation position of the finger 1. Next, a rotation of the finger 1 is detected. As this rotation detecting method, the following methods may be employed, namely, a method for detecting a direction of a hand imaged in the photographed image 300-1; another method for detecting a direction of a nail imaged in the photographed image 300-1; and the like may be employed. Since the nail area is illuminated by the light from the light source 3, this nail area can be imaged in a sharper manner, so that the method for detecting the direction of the nail is employed in this embodiment 7. Firstly, the nail area is detected from the finger area acquired in the above-described sequential operation. As this detecting method, the below-mentioned methods may be employed, namely, a method for emphasizing an edge; another method for lighting light onto a fingertip so as to detect the nail area due to a difference in reflectance values; and the like may be employed. Next, a rotation of the acquired nail area is detected. When the finger 1 is photographed from such a front plane as the photographed image 300-1, the nail area is photographed in an elliptical shape having a longer lateral size. As a result, a direction of the nail area along the long axial direction is predicted, and such an angle is calculated which is defined with respect to the long axis and the horizontal direction within the photographed image 300-1, so that a rotation amount of the nail may be calculated. As a consequence, the axial rotation of the nail with respect to the long axis of the finger 1 may be detected.

A similar process operation is carried out with respect to the photographed image 300-2 so as to detect an axial rotation of the short axis of the finger 1 and a position of the finger 1 along the front/rear directions. A contour of the finger 1 is extracted from the photographed image 300-2, and a center position of the extracted finger area is calculated as a position of the finger 1. Furthermore, since a direction of the finger area along the longitudinal direction is investigated, so that an axial rotation with respect to the short axis of the finger 1 is sensed.

The authentication apparatus judges as to whether or not the finger 1 is presented at the proper position based upon the acquired information as to the position of the finger 1 and the rotation of the finger 1. This judging operation is performed by comparing both the position and the rotation of the finger 1 during the registering operation with the presentation position and the rotation of the finger 1 during the authenticating operation. In such a case that differences in the positional shifts and the rotation angles during both the registering operation and the authenticating operation are larger than the previously defined allowable range, the authentication apparatus guides the user to again present the finger 1.

It should also be noted that since wide-angle lenses are utilized in the imaging units 121-1 and 121-2, even when a distance between the finger 1 and the imaging units 121-1 and 121-2 is short, a positional shift within a wide range may be captured.

Embodiment 8

Figure 11A:
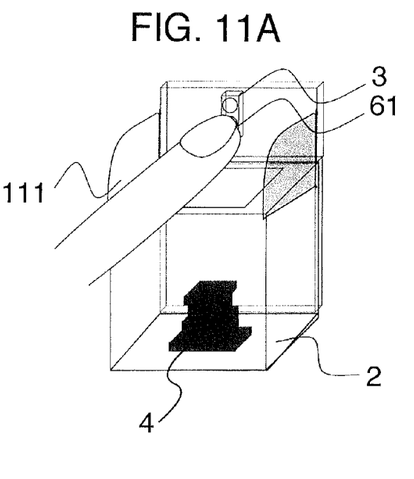
FIG. 11A and FIG. 11B illustratively indicate one structural example as to a compact input interface which authenticates a person based upon a vein of a fingertip.
Figure 11B:
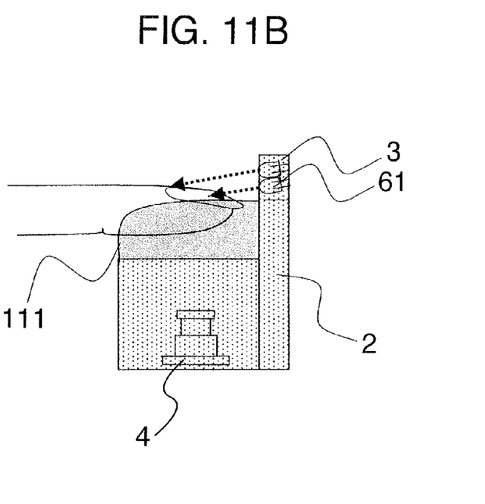

FIG. 11A and FIG. 11B show one structural example as to an input interface 2 of a compact non-contact type finger vein authentication apparatus which performs authentication based upon a vein of a fingertip. FIG. 11A is a schematic diagram for showing the input interface 2, and FIG. 11B is a side view for representing the input interface 2.

In this embodiment 8, a vein of a finger portion from a fingertip to a palm located near a first joint is presented in a non-contact manner so as to perform authentication. In the case that authentication is carried out by utilizing veins of an entire finger, there are some possibilities that since the finger is bent, a photographed image is changed, so that authentication precision is lowered. However, if the fingertip portion is utilized, then an adverse influence caused by such a change in the finger shape can be reduced, so that the stable authentication can be carried out. Also, since a photographing range is narrow, the input interface 2 can be made compact. Furthermore, since an illumination range is also made narrow, a total number of the light sources 3 may be reduced.

As indicated in FIG. 11A and FIG. 11B, a light shielding plate 111 for shielding external light is installed on the side surface of the input interface 2. Since the dimension of the light shielding plate 111 may be sufficiently made by such a dimension capable of shielding light from the fingertip up to the first joint portion, such an authentication apparatus may be realized which may be readily operated by the user, while another finger and the root of the own finger 1 are hardly contacted to this light shielding plate 111.

A visible light source 61 for instructing a presentation position of the finger 1, and an infrared light source 3 for photographing a vein image are installed within a wall of the front/upper portions of the authentication apparatus. These light sources 61 and 3 may be replaced by a single light source by utilizing an LED capable of emitting light having a plurality of wavelengths. As a result, the input interface 2 may be made more compact. As indicated in FIG. 11B, the user presents her finger 1 in such a manner that the visible light of the visible light source 61 lights a central portion of a nail so as to perform authentication. At this time, if the infrared light source 3 is installed in such a manner that the infrared light illuminates a nail skin portion of the finger 1, then a more sharp image may be photographed.

Embodiment 9

Figure 12A:
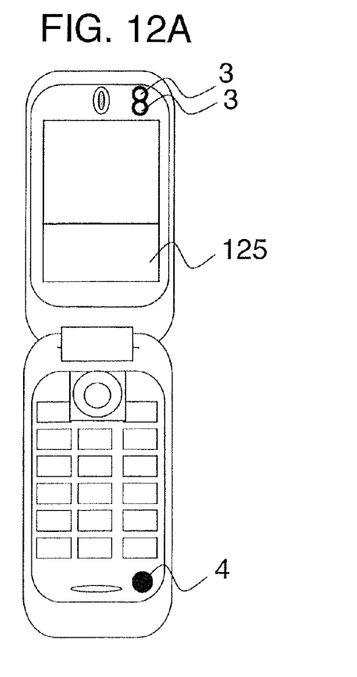
FIG. 12A and FIG. 12B illustratively show an example as to an apparatus to which the personal authentication apparatus of the present invention is applied.
Figure 12B:
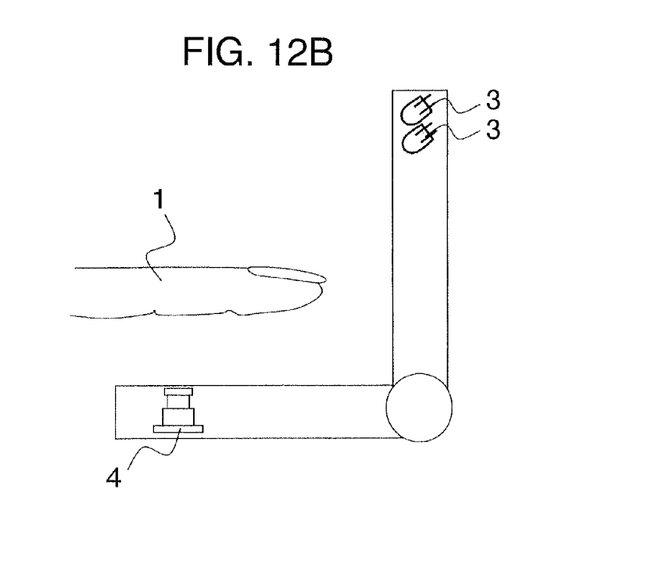

FIG. 12A and FIG. 12B illustratively show an example that the authentication apparatus of the present invention has been applied to a folding type portable telephone. FIG. 12A is an upper view of the portable telephone, and FIG. 12B is a side view of the portable telephone.

An imaging apparatus 4 is installed on the same plane as a button installation plane of the above-explained portable telephone, and a light source 3 is installed at a position opposite to the imaging apparatus 4. In the portable telephone equipped with the authentication apparatus, when lids of the portable telephone are closed, the portable telephone is automatically locked. Under this locking condition, all of data such as a telephone directory, electronic mails, and images are locked, and all of telephone operations except for turning ON/OFF of a power supply cannot be performed. When the portable telephone is utilized, the user presents her finger 1 in such a manner as shown in this drawing. At this time, when the user presents her finger 1 to the button of the portable telephone in such a manner that the position of the fingertip is made coincident with the center axis of the finger 1, a similar effect as explained in the positioning-purpose lines 22 and 23 shown in FIG. 2 may be achieved. Also, such a line as represented in FIG. 12A is displayed on a display unit 125 of the portable telephone. The user sets the height of her finger 1 to be coincident with this position, so that the height for presenting the finger 1 can be determined. When the finger 1 is presented, light is illuminated from the light source 3, so that an image of a vein pattern is photographed by the imaging unit 4. The authentication apparatus judges as to whether or not the user corresponds to a justice user of the portable telephone by employing the photographed image. When this user can be correctly authenticated, the locking condition of the portable telephone is released. This authentication function may be similarly utilized so as to release locking of a mail function, to release a restriction of a dialing operation, and to lock an IC card function.

The above-described authentication apparatus of the present invention may be mounted on any sorts of electronic appliances having L-shaped constructions, for instance, portable telephones, notebook PCs, ATMs, PDAs, and the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A personal authentication apparatus comprising:
a plurality of light sources each of which emits infrared light;
an input interface which includes an imaging unit for imaging an image of a blood vessel of a finger of a living body by the infrared light emitted from the plurality of light sources;
an image calculating unit which performs a feature extracting operation and a feature authenticating operation with respect to the photographed image of the blood vessel;
a positioning unit for presenting the finger; and
a control unit which controls at least the plurality of light sources, wherein
a presentation position of the finger is set to a position higher than the imaging unit;
the plurality light sources are installed at positions which are deeper than the presentation position of the finger and also are higher than the presentation position of the finger; and
the control unit controls amounts of infrared light emitted from the plurality light sources according to illumination positions of the infrared light emitted from the plurality light sources on the finger, respectively.

2. A personal authentication apparatus as claimed in claim 1 wherein:
the positioning unit includes a sign written on a surface of the input interface.

3. A personal authentication apparatus as claimed in claim 2 wherein:
the sign is constituted by a line for setting a height of the finger, either a line or a point which sets a position of a fingertip, and either a line or a point which sets a presentation direction of the finger.

4. A personal authentication apparatus as claimed in claim 1 wherein:
the positioning unit includes an air blowing unit for blowing air to a boundary of the presentation position of the finger.

5. A personal authentication apparatus as claimed in claim 1 wherein:
the positioning unit includes a visible light source which is installed at either a position or an angle where a specific visualization effect is produced when the finger is presented at the presentation position in a correct manner.

6. A personal authentication apparatus as claimed in claim 1 wherein:
the imaging unit images a fingertip of the finger by way of penetration light which penetrates through the fingertip; and
the image calculating unit performs authentication by utilizing a blood vessel pattern of the fingertip.

7. A personal authentication apparatus as claimed in claim 1 wherein:
said image calculating unit includes a unit for correcting a rotation of the photographed image of the finger.

8. A personal authentication apparatus comprising:
a plurality of light sources each of which emits infrared light;
an input interface which includes an imaging unit for imaging an image of a blood vessel of a finger of a living body by the infrared light emitted from the plurality of light sources;
an image calculating unit which performs a feature extracting operation and a feature authenticating operation with respect to the photographed image of the blood vessel;
a positioning unit for presenting the finger; and
a control unit which controls at least the plurality of light sources, wherein
a presentation position of the finger is set to a position higher than the imaging unit;
the plurality light sources are installed at positions which are deeper than the presentation position of the finger and also are higher than the presentation position of the finger; and
the control unit controls amounts of infrared light emitted from the plurality light sources in a manner that an amount of the emitted infrared light is smaller as an illumination position of the emitted infrared light on the finger is closer to a fingertip of the finger.

* * * * *